United States Patent

Shioyama et al.

[15] 3,699,228
[45] Oct. 17, 1972

[54] CARBAMOYL SACCHARIN DERIVATIVES AS FUNGICIDES

[72] Inventors: Osamu Shioyama, Osaka; Seizo Mine, Ibaragi-shi; Kikuzo Murata, Kawachinagano-shi, all of Japan

[73] Assignee: Nihon Nahyaku Co., Ltd., Tokyo, Japan

[22] Filed: Oct. 21, 1969

[21] Appl. No.: 868,236

[30] Foreign Application Priority Data

Oct. 25, 1968    Japan .................43/77381
Sept. 9, 1969    Japan .................44/71023

[52] U.S. Cl. ................................................424/270
[51] Int. Cl. ........................... A01n 9/12, A01n 9/22
[58] Field of Search .....................424/270; 260/301

[56] References Cited

UNITED STATES PATENTS 3,264,314    8/1966    Baker et al. ..............260/301

Primary Examiner—Albert T. Meyers
Assistant Examiner—Vincent D. Turner
Attorney—Karl W. Flocks

[57] ABSTRACT

Carbamoyl saccharin derivatives of the formula:

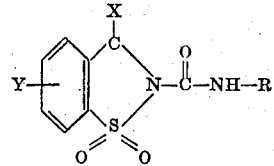

wherein X signifies an oxygen atom or sulfur atom, Y signifies a hydrogen atom, halogen atom or methoxy group, and R signifies an aliphatic hydrocarbon group; aryl group; aryl group which may be substituted by a lower alkyl, alkoxy, hydroxyl, nitro, trifluoromethyl, acetyl, dialkylamino, sulfonamido or carboxy group; aralkyl group; aralkyl group which may be substituted by a halogen atom, methyl, methoxy, or nitro group; benzene sulfonyl group, benzene sulfonyl group whose benzene nucleus may be substituted by a halogen atom or methyl group, are useful as fungicides.

5 Claims, No Drawings

CARBAMOYL SACCHARIN DERIVATIVES AS FUNGICIDES

The present invention relates to a fungicidal composition for agricultural and horticultural use. More particularly, the present invention relates to a fungicidal composition for agricultural and horticultural use, which contains as an active ingredient a compound represented by the general formula (I)

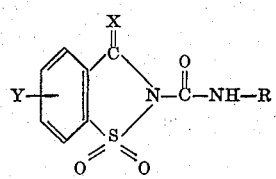

(I)

where X signifies an oxygen atom or sulfur atom, Y signifies a hydrogen atom, halogen atom or methoxy group, and R signifies an aliphatic hydrocarbon group; aryl group; aryl group which may be substituted by a lower alkyl group, lower alkoxy group, hydroxyl group, nitro group, trifluoromethyl group, acetyl group, dialkylamine group, sulfonamido group or carboxy group; aralkyl group; aralkyl group which may be substituted by a halogen atom, methyl group, methoxy group or nitro group; benzenesulfonyl group; benzenesulfonyl whose benzene nucleus may be substituted by a halogen atom or methyl group.

An object of the present invention is to provide a fungicidal composition valuable for the wide protection of useful plants in the agricultural and horticultural fields from various, harmful pests.

In accordance with the present invention, it has been found that one group of carbamoyl saccharine derivatives represented by the above general formula (I) has a fungicidal activity in the wide range.

The present compounds represented by the above general formula are crystals and prepared in accordance with the following methods (A) or (B). Any of said two methods may be applicable to some kinds of the compounds. Method (A):

This method comprises a reaction (a) wherein an alkali metal salt of saccharine is reacted with phosgene in an inert solvent such as, for example, dioxane or tetrahydrofuran at room temperature to reflux temperature to produce chlorocarbonyl saccharine and a reaction (b) wherein the resultant chlorocarbonyl saccharine is reacted with a corresponding primary amine in an inert solvent such as, for example, dioxane, acetone, tetrahydrofuran, benzene or xylene at 0° C. to reflux temperature to produce the objective carbamoyl saccharine derivatives.

(a)

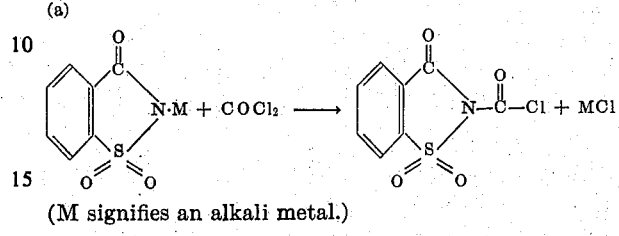

(M signifies an alkali metal.)

(b)

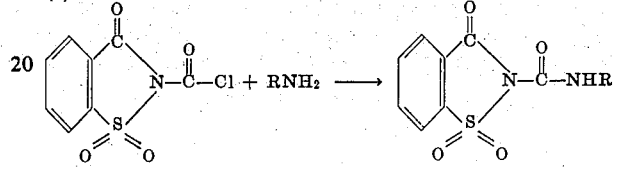

(R has the same significance as mentioned above.)

In the reaction (a), it is necessary to use an anhydrous alkali metal salt of saccharine.

The amount of the amine used to be reacted with chlorocarbonyl saccharine in the reaction (b) is varied in a range of from an equimolar amount to an amount twice per the mole of the latter, and in the case of equal mole, the presence of a de-hydrochloric acid agent such as, for example, tertiary amine such as triethylamine and pyridine is desired.

Method (B):

This method is carried out by reacting saccharine, thiosaccharine or nucleusly substituted derivatives thereof with the equal mole or somewhat excessive mole of corresponding isocyanate on the basis per mol of said saccharines in an inert solvent such as, for example, benzene, toluene, xylene, ether, dioxane and tetrahydrofuran at a temperature of from 0° C. to reflux temperature.

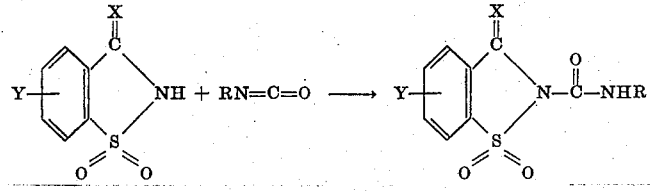

(X, Y and R have the same significances as mentioned above.)

Representative examples of the compounds represented by the general formula (I) are shown in the following Table in which methods used are also indicated therein for reference.

| No. | X | Y | R | M.P. (° C.) | Method A and/ or B |
|---|---|---|---|---|---|
| 1 | O | H | —CH$_3$ | 216~217 | B |
| 2 | O | H | —C$_2$H$_5$ | 224 | B |
| 3 | O | H | —C$_3$H$_7$(n) | 220 | B |
| 4 | O | H | —C$_4$H$_9$(n) | 131 | B |
| 5 | O | H | —⌬ | 183 | B |

Table – Continued

| No. | X | Y | R | M.P. (°C.) | Method A and/or B |
|---|---|---|---|---|---|
| 6 | O | H | −CH₂−C₆H₅ | 161~163 | B |
| 7 | O | H | −CH₂−C₆H₄(Cl) (o-Cl) | 76~79 | B |
| 8 | O | H | −CH₂−C₆H₄−Cl (p-Cl) | 158~159 | B |
| 9 | O | H | −CH₂−C₆H₃Cl₂ (2,4-diCl) | 214~216 | B |
| 10 | O | H | −CH₂−C₆H₂Cl₃ (2,4,5-triCl) | 211~213 | B |
| 11 | O | H | −CH₂−C₆H₄(CH₃) (o-CH₃) | 166~168 | B |
| 12 | O | H | −CH₂−C₆H₄(CH₃) (m-CH₃) | 194~195 | B |
| 13 | O | H | −CH₂−C₆H₄−CH₃ (p-CH₃) | 155~156 | B |
| 14 | O | H | −CH₂−C₆H₄−NO₂ (p-NO₂) | 183~185 | B |
| 15 | O | H | −CH₂CH₂−C₆H₅ | 150~150.5 | B |
| 16 | O | H | −CH(CH₃)−C₆H₅ | 135~136 | B |
| 17 | O | H | −CH(C₂H₅)−C₆H₅ | 118~119 | B |
| 18 | O | H | −CH(CH₃)CH₂−C₆H₅ | 128~129 | B |
| 19 | O | H | −CH₂CH(CH₃)−C₆H₅ | 137~138 | B |
| 20 | O | H | −C₆H₄−OH (o-OH) | 145~150 | A |
| 21 | O | H | −C₆H₄−OH (p-OH) | 150~155 | A |
| 22 | O | H | −C₆H₄−OCH₃ (o-OCH₃) | 173~175 | A, B |
| 23 | O | H | −C₆H₄−OCH₃ (p-OCH₃) | 179~181 | A, B |
| 24 | O | H | −C₆H₄−OC₂H₅ (p-OC₂H₅) | 156 | A, B |
| 25 | O | H | −SO₂−C₆H₅ | 235~240 (dec.) | A, B |

Table – Continued

| No. | X | Y | R | M.P. (°C.) | Method A and/or B |
|---|---|---|---|---|---|
| 26 | O | H | −SO$_2$−C$_6$H$_4$−Cl | 240~245 (dec.) | A, B |
| 27 | O | H | −SO$_2$−C$_6$H$_4$−CH$_3$ | 238~242 (dec.) | A, B |
| 28 | O | 6-Cl | −CH$_3$ | 201~203 | B |
| 29 | O | 6-Cl | −C$_4$H$_9$(n) | 122~123 | B |
| 30 | O | 6-Cl | −C$_6$H$_5$ | 183~184 | B |
| 31 | O | 6-Cl | −CH$_2$−C$_6$H$_5$ | 176~180 | B |
| 32 | O | 5-Cl | −CH$_3$ | 173~175 | B |
| 33 | O | 5-Cl | −C$_4$H$_9$(n) | 135 | B |
| 34 | O | 5-Cl | −C$_6$H$_5$ | 174~176 | B |
| 35 | O | 5-Cl | −CH$_2$−C$_6$H$_5$ | 160~161 | B |
| 36 | O | 4-Cl | −CH$_3$ | 185 | B |
| 37 | O | 4-Cl | −C$_4$H$_9$(n) | 102~104 | B |
| 38 | O | 4-Cl | −C$_6$H$_5$ | 178 | B |
| 39 | O | 4-Cl | −CH$_2$−C$_6$H$_5$ | 190~192 | B |
| 40 | O | 5-CH$_3$O | −CH$_3$ | 203~205 | B |
| 41 | O | 5-CH$_3$O | −C$_4$H$_9$(n) | 182~183 | B |
| 42 | O | 5-CH$_3$O | −C$_6$H$_5$ | 194 | B |
| 43 | O | 5-CH$_3$O | −CH$_2$−C$_6$H$_5$ | 197~199 | B |
| 44 | S | H | −CH$_3$ | ¹85~87 | B |
| 45 | S | H | −C$_2$H$_5$ | ¹80~83 | B |
| 46 | S | H | −C$_3$H$_7$(n) | ¹138~140 | B |
| 47 | S | H | −C$_4$H$_9$(n) | ¹60~63 | B |
| 48 | S | H | −C$_6$H$_5$ | 140~143 | B |
| 49 | S | H | −CH$_2$−C$_6$H$_5$ | 103~104 | B |
| 50 | O | H | −C$_6$H$_4$−N(CH$_3$)$_2$ | 93~95 | A |
| 51 | O | H | −C$_6$H$_4$−CF$_3$ | 180~182 | A, B |
| 52 | O | H | −CH$_2$−(naphthyl) | 244~246 | A, B |
| 53 | O | H | −C$_6$H$_3$(CH$_3$)$_2$ | 170~172 | A, B |
| 54 | O | H | −C$_6$H$_4$−N(C$_2$H$_5$)$_2$ | 126~129 | A |

Table —Continued

| No. | X | Y | R | M.P. (°C.) | Method A and/or B |
|---|---|---|---|---|---|
| 55 | O | H | —C₆H₄—C₂H₅ | 154~156 | A, B |
| 56 | O | H | —C₆H₄—S(O)(O)—NH₂ | 200~202 | A |
| 57 | O | H | —C₆H₃(CH₃)(NO₂) | 204~205 | A |
| 58 | O | H | —C₆H₃(CH₃)(NO₂) | 200~202 | A |
| 59 | O | H | —C₆H₄—COOH | >250 | A |
| 60 | O | H | —C₆H₄—COCH₃ | 183~185 | A |
| 61 | O | H | —C₆H₄—NO₂ | 235~238 | A, B |
| 62 | O | H | —C₆H₄—CH₃ | 163~166 | A, B |
| 63 | O | H | —C₆H₄—NO₂ | 206~208 | A, B |
| 64 | O | H | —C₄H₉(i) | 123~124 | A, B |
| 65 | O | H | —C₆H₁₃(n) | 114~115 | A, B |
| 66 | O | H | —C₈H₁₇(n) | 101~102 | A, B |
| 67 | O | H | —C₁₂H₂₅(n) | 105~107 | A, B |
| 68 | O | H | —CH₂CH=CH₂ | 169~170 | A, B |

¹ Decanoate.

The compounds represented by the general formula (I) can be formulated according to the present invention into a fungicidal composition for agricultural and horticultural use, such as, for example, dust, wettable powder and emulsion by carrying them on an inert carrier in the customary manner for formulating pesticidal compositions and, if required, adding a usual adjuvant such as a surfactant, a dispersing and stabilizing agent. As examples of the inert solid carriers, there can be enumerated talc, clay, bentonite, diatomaceous earth, potter's clay, sand, shell powders, sawdust, rice hulls and the like. The present compounds may be formulated into pesticidal compositions by absorbing, adsorbing, adhering or mixing to these carriers in the form of being directly mixed and crushed or in the form of being dissolved in a solvent or in a material which can dissolve by the aid of suitable adjuvants. As the liquid carriers, there may be used a material which can dissolve the present compounds or a material capable of being dispersed or dissolved by the aid of suitable adjuvants even if it could not dissolve the present compounds. For example, there can be enumerated water, alcohol, dimethylformamide, benzene, xylene and methylnaphthalene.

The present compositions are applicable to plants to be protected in accordance with the conventional manner for applying other pesticidal composition. In general, the present compositions have an advantage of being extremely high in effectivity to control pests which infest useful plants by applying to them before being attacked by pests. Further, it is possible in the present invention to compose or use by mixing to the present composition other fungicides and/or insecticides for the purpose of controlling pests and insects which infest simultaneously at the occurrence of pests capable of controlling by the present composition or for the purpose of increasing the fungicidal effect of the present composition. It is compatible with known fungicides, for example, Blasticidin S, salts thereof, derivatives thereof, Kasugamycin, diisopropyl S-benzyl thiol phosphate, O-ethyl-S,S-diphenyl dithiophosphate, N-trichloromethylthio-4-cyclohexene-1,2-dicarboximide, zinc ethylene bis-dithiocarbamate, or polyoxin, and also compatible with known insecticides, for example, EPN, 0,0-dimethyl-0-(3-methyl-4-nitro-phenyl) thiophosphate, dimethyl dicarbethoxy-ethyl dithiophosphate, 0,0-dimethyl-0-(3-methyl-4-methylthiophenyl) thiophosphate, 1-naphthyl-N-methylcarbamate, or m-tolyl-N-methyl carbamate for the purpose of simultaneously controlling rice stem borers, green rice leafhopper or planthoppers.

The present fungicidal compositions show excellent effects on pests of cereals, fruit-trees and vegetables.

In particular, the present compositions are extremely excellent in the control on blast (*Piricularia oryzae*), scab of cucumbers (*Cladosporium cucumerinum*), anthracnose of cucumbers (*Colletotrichum lagenarium*) and the like.

Control Effects of the Present Compounds on Blast (pot test):

A liquid containing the designated concentration of each testing chemical was sprayed to young riceplants (Variety: Jukkoku, height of grasses: 20 cm.) grown in a glasshouse at a rate of 10 ml./pot on a turn table by a spray gun. After one day, the treated plants are inoculated with a suspension of spores of blast cultured in rice-strow medium, kept in a moist chamber at 24° C. for 24 hours, and then left in a vinyl house. Examining the number of fungal spots per leaf after 4 days from the inoculation, the prevention rate was calculated.

Prevention rate (%)
= (number of fungal spots per leaf in untreated block − number of fungal spots per leaf in treated block) / number of fungal spots per leaf in untreated block × 100

TABLE 1

| Fungicide | Concentration (ppm) | Number of fungal spots | Prevention rate (%) |
|---|---|---|---|
| 1 | 500 | 0.82 | 97.1 |
| 2 | 500 | 0.94 | 96.7 |
| 3 | 500 | 2.15 | 92.4 |
| 4 | 500 | 1.68 | 94.1 |
| 5 | 500 | 0.51 | 98.2 |
| 6 | 500 | 0 | 100 |
| PMA | As Hg 20 | 3.54 | 87.5 |
| Untreated | — | 28.32 | 0 |

TABLE 2

| Fungicide | Concentration (ppm) | Number of fungal spots | Prevention rate (%) |
|---|---|---|---|
| 7 | 500 | 1.00 | 97.1 |
| 8 | 500 | 0 | 100 |
| 9 | 500 | 2.73 | 92.1 |
| 10 | 500 | 5.08 | 85.3 |
| 11 | 500 | 0.58 | 99.2 |
| 12 | 500 | 2.93 | 91.5 |
| 13 | 500 | 0 | 100 |
| 14 | 500 | 6.60 | 80.9 |
| 15 | 500 | 0 | 100 |
| 16 | 500 | 0 | 100 |
| 17 | 500 | 1.42 | 95.9 |
| 18 | 500 | 2.21 | 93.6 |
| 19 | 500 | 1.66 | 95.2 |
| Untreated | — | 34.52 | 0 |

As the result of carrying out the same tests by use of other compounds, it was found that the compounds of 21, 22, 29 and 49 showed the prevention rate of 95 percent or more in the concentration of 500 p.p.m.. However, compounds except for the above-described ones could also show the prevention rate of 70 percent or more.

Some representative examples of processes for synthesizing the compounds represented by the general formula (I) are illustrated as follows:

Synthetic Example 1:

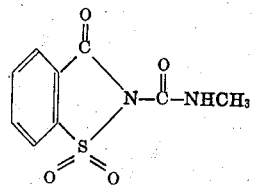

(compound 1)

9.1 g. (0.05 mole) of 1,2-benzisothiazoline-3-one-1,1-dioxide were dissolved in 100 ml. of dioxane and added dropwise 2.9 g. (0.05 mole) of methyl isocyanate while stirring. After adding of one drop of triethylamine thereto, the resultant solution was stirred at room temperature for 6 hours and then allowed to stand overnight. The precipitate was filtered, washed with dioxane and then dried to obtain 10 g. of white crystals having a melting point of 216°–217° C. Yield: 83 percent Synthetic Example 2:

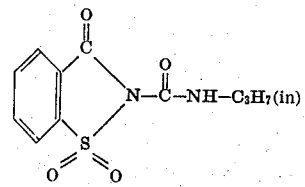

(compound 3)

Operating in the same manner as in Synthetic Example 1 with use of 9.1 g. (0.05 mole) of 1,2-benzisothiazoline-3-one-1,1-dioxide, 4.3 g. (0.05 mole) of n-propyl isocyanate, one drop of pyridine and 100 ml. of dioxane, there were obtained 9.4 g. of white crystals having a melting point of 220° C. Yield: 70 percent Synthetic Example 3:

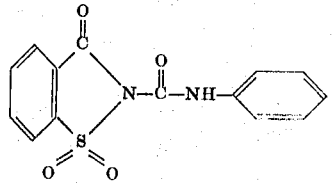

(compound 5)

9.1 g. (0.05 mole) of 1,2-benzisothiazoline-3-one-1,1-dioxide were dissolved in 100 ml. of dioxane and added dropwise with 6 g. (0.05 mole) of phenyl isocyanate while stirring. After the addition of one drop of triethylamine thereto, the resultant solution was stirred at a temperature of 80°–90° C. for 6 hours and then allowed to stand overnight. The precipitate was filtered, washed with dioxane and then dried to obtain 13.4 g. of white crystals having a melting point of 183° C. Yield: 85 percent Synthetic Example 4:

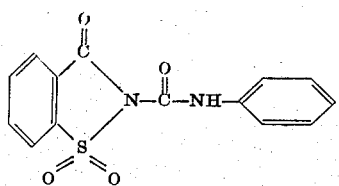

(compound 5)

9.1 g. (0.05 mole) of 1,2-benzisothiazoline-3-one-1,1-dioxide, 6 g. (0.05 mole) of phenyl isocyanate and two drops of triethylamine were added to 300 ml. of toluene, heated and refluxed for 6 hours and then allowed to stand overnight. The precipitate was filtered, washed and dried to obtain 12 g. of white crystals having a melting point of 182°–183° C. Yield: 80 percent Synthetic Example 5:

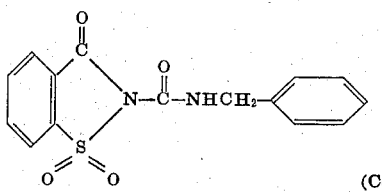

(Compound 6)

9.1 g. (0.05 mole) of 1,2-benzisothiazoline-3-one-1,1-dioxide were dissolved in 100 ml. of dioxane and added dropwise with 6.9 g. (0.05 mole) of benzyl isocyanate while stirring. After the addition of two drops of triethylamine thereto, the resultant solution was stirred at room temperature for 3 hours, then stirred at a temperature of 80°–90° C. for 2 hours and then allowed to stand overnight. The precipitate was filtered, washed with a small amount of dioxane and then dried to obtain 12.6 g. of white crystals having a melting point of 161°–163° C. Yield: 79 percent Synthetic Example 6:

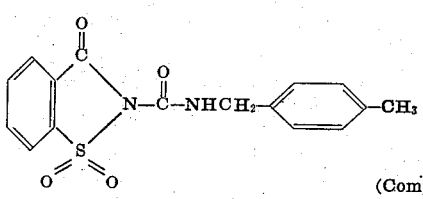

(Compound 13)

9.1 g. (0.05 mole) of 1,2-benzisothiazoline-3-one-1,1-dioxide were dissolved in 120 ml. of dioxane, added with one drop of triethylamine, added dropwise with 7.4 g. (0.05 mole) of benzyl isocyanate, stirred at room temperature for 8 hours and then allowed to stand overnight.

The precipitate was filtered, dried and then recrystallized from ethanol to obtain 15.3 g. of white crystals having a melting point of 155°–156° C. Yield: 92.5 percent Synthetic Example 7:

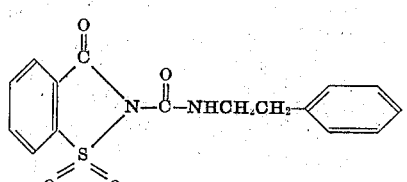

(Compound 15)

Operating in the same manner as in Synthetic Example 6 with use of 9.1 g. (0.05 mole) of 1,2-benzisothiazoline-3-one-1,1-dioxide and 7.4 g. (0.05 mole) of β-phenylethyl isocyanate, there was obtained 15.3 g. of white crystals having a melting point of 150°–150.5° C. Yield: 92.5 percent Synthetic Example 8:

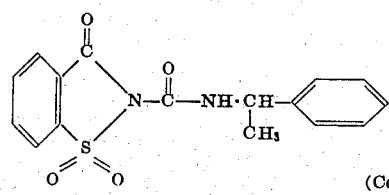

(Compound 16)

9.1 g. (0.05 mole) of 1,2-benzisothiazoline-3-one-1,1-dioxide, 7.4 g. (0.05 mole) of α-phenylethyl isocyanate and two drops of pyridine were added to 500 ml. of ether and stirred at reflux temperature for 6 hours. After standing overnight, the precipitate were filtered, dried and recrystallized from ethanol to obtain 16.1 g. of white crystals having a melting point of 135°–136° C. Yield: 97 percent Synthetic Example 9:

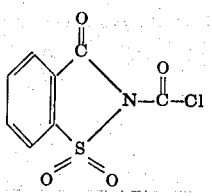

102.5 g. (0.5 mole) of anhydrous sodium salt of benzisothiazoline-3-one-1,1-dioxide were suspended in 800 ml. of dried dioxane and passed while stirring at room temperature with phosgene. After recognizing no rise of temperature, temperature was raised up to 60°–70 C. to pass phosgene therethrough for additional 20 minutes. Subsequently, nitrogen gas was passed therethrough at the same temperature to remove the excessive phosgene and then the temperature was raised up to 80°–90° C. to filter the resultant solution within being hot. After washing the filtered residue with 200 ml. of hot dioxane, joining together the filtrate and washed solution to be subjected to dry under a reduced pressure, there was obtained 104 g. of white crystals having a melting point of 150°–160° C. (dec.). Yield: 85 percent Synthetic Example 10:

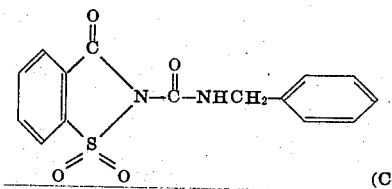

(Compound 6)

4.3 g. (0.04 mole) of benzylamine were dissolved in 25 ml. of dioxane and added little by little with 4.9 g. (0.02 mole) of crystals of 2-chlorocarbonyl-benzisothiazoline-3-one-1,1-dioxide under a cooled condition (below 15° C.) while stirring. After the addition of total amount of said crystals, the mixture was stirred at room temperature for 2 hours. After the reaction, the reaction mixture was poured into 300 ml. of ice water, and the precipitate was filtered, washed with 50 ml. of ethanol and then dried to obtain 5 g. of crystals having a melting point of 155°–160° C. Yield: 79 percent Re-crystallized from dioxane, melting point: 163°–165° C.

Synthetic Example 11:

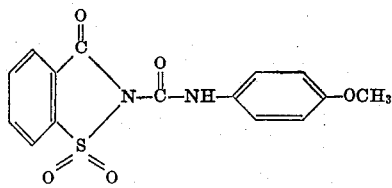

(Compound 23)

4.9 g. (0.04 mole) of p-anisidine were dissolved in 50 ml. of acetone and added little by little with 4.9 g. (0.02 mole) of 2-chlorocarbonylbenzisothiazoline-3-one-1,1-dioxide under a cooled condition while stirring. After the addition of total amount of said material, the resultant mixture was stirred at room temperature for 2 hours. Treating the reaction mixture in the same manner as in Synthetic Example 10, there were obtained 4.7 g. of crystals having a melting point of 175°–178° C. Yield: 71 percent Re-crystallized from ethanol, melting point: 179°–181° C.

Synthetic Example 12:

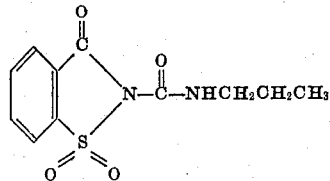

(Compound 3)

4.9 g. (0.02 mole) of 2-chlorocarbonyl-benzisothiazoline-3-one-1,1-dioxide were dissolved in 25 ml. of dioxane and added dropwise with 2.4 g. (0.04 mole) of n-propylamine dissolved in 10 ml. of dioxane under a cooled condition (below 15° C.) while stirring. After the dropwise addition of total amount thereof, the mixture was stirred at room temperature for 2 hours. After the reaction ceased, the precipitated n-propylamine hydrochloride was filtered. Concentrating the filtrate, there were obtained 3.1 g. of white crystals having a melting point of 220° C. Yield: 58 percent Synthetic Example 13:

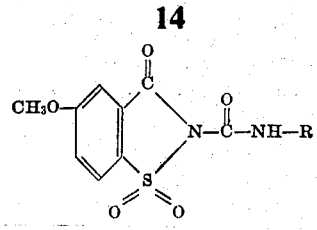

0.49 g. (0.02 mole) of 5-methoxy saccharine were dissolved in 7 ml. of dried acetone, added with 0.025 to 0.03 mole of isocyanates and one drop of triethylamine and kept at room temperature overnight while sometimes shaking. The crystals were filtered, washed with a small amount of acetone and dried to obtain the objective material.

| R | Amount of isocyanate (mole) | Yield (g.) | Yield (%) | m.p. (°C.) |
|---|---|---|---|---|
| $CH_3$ | 0.17 g. (0.03 mole) | 0.6 g. | 96.8% | 203° to 205° |
| $n\text{-}C_4H_9$ | 0.30 g. (0.03 mole) | 0.6 g. | 85.8% | 182° to 183° |
| —⟨phenyl⟩ | 0.30 g. (0.025 mole) | 0.7 g. | 92.1% | 194° |
| $-CH_2-$⟨phenyl⟩ | 0.33 g. (0.025 mole) | 0.5 g. | 50.6% | 197° to 199° |

Synthetic Example 14:

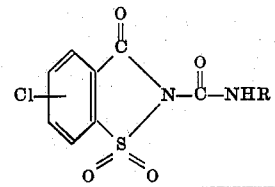

4.4 g. (0.02 mole) of chlorosaccharines were dissolved in dioxane. At that time, 4- or 5-chlorosaccharine required 20 ml. of dioxane and 6-chlorosaccharine required 60 ml. thereof. Subsequently, the resultant solution was added with 0.022 mole of isocyanate and two drops of triethylamine, and kept at room temperature overnight while sometimes shaking. The resultant crystals were filtered, washed with ether and then dried to obtain the objective compound.

| Objective compound obtained | Yield Grams | Yield Percent | m.p. (° C.) |
|---|---|---|---|
| [structure with Cl, N—C(O)—NHCH₃] | 4.5 | 81.8 | 185 |
| [structure with Cl, N—C(O)—NHC₄H₉(n)] | 2.2 | 34.8 | 102~104 |

Table — Continued

| Objective compound obtained | Yield Grams | Yield Percent | m.p. (° C.) |
|---|---|---|---|
| [3-chloro-benzisothiazolinone-1,1-dioxide-N-C(O)-NH-phenyl] | 4.0 | 59.3 | 178 |
| [3-chloro-benzisothiazolinone-1,1-dioxide-N-C(O)-NHCH₂-phenyl] | 5.0 | 71.2 | 190~192 |
| [5-chloro-benzisothiazolinone-1,1-dioxide-N-C(O)-NHCH₃] | 4.2 | 76.5 | 173~175 |
| [5-chloro-benzisothiazolinone-1,1-dioxide-N-C(O)-NHC₄H₉(n)] | 2.7 | 42.7 | 135 |
| [5-chloro-benzisothiazolinone-1,1-dioxide-N-C(O)-NH-phenyl] | 5.0 | 74.2 | 174~176 |
| [6-chloro-benzisothiazolinone-1,1-dioxide-N-C(O)-NHCH₂-phenyl] | 4.8 | 69.4 | 160~161 |
| [6-chloro-benzisothiazolinone-1,1-dioxide-N-C(O)-NHCH₃] | 4.5 | 81.8 | 201~203 |
| [6-chloro-benzisothiazolinone-1,1-dioxide-N-C(O)-NHC₄H₉(n)] | 5.0 | 79 | 122~123 |
| [6-chloro-benzisothiazolinone-1,1-dioxide-N-C(O)-NHCH₂-phenyl] | 3.5 | 49.8 | 183~184 |

The following examples are given merely as illustrative but not limiting of the present invention. Many variations may be possible without departing from the spirit and scope of the present invention. Parts are by weight.

EXAMPLE 1

A wettable powder was prepared by mixing and crushing the following materials:

| | |
|---|---|
| 2-Methylcarbamoyl-1,2-benzisothiazoline-3-one-1,1-dioxide: | 20 parts |
| Diatomaceous earth: | 75 parts |
| Polyoxyethylene alkylphenylether: | 5 parts |

EXAMPLE 2

A wettable powder was prepared by mixing and crushing the following materials:

| | |
|---|---|
| 2-Phenylcarbamoyl-1,2-benzisothiazoline-3-one-1,1-dioxide: | 40 parts |
| A mixture of diatomaceous earth and clay: | 55 parts |
| Polyoxyethylene alkylphenylether: | 5 parts |

EXAMPLE 3

A dusting powder was prepared by mixing and crushing the following materials:

| | |
|---|---|
| 2-Benzylcarbamoyl-1,2-benzisothiazoline-3-one-1,1-dioxide: | 4 parts |
| Clay: | 94 parts |
| Calcium stearate: | 2 parts |

By spraying said dusting powder to rice plants at a rate of 3 to 4 kg. (120 to 160 g. of active ingredient)/10 a. twice before being attacked by leaf blast and an earlier infection of the pest (an additional spray was required after rice plants were attacked by the pest), the infestation of leaf blast was prevented and the health of rice plants was restored.

Rice plants applied by the present dusting powder have scarcely had a danger of being attacked again by leaf blast for a long period of time.

EXAMPLE 4

A wettable powder was prepared by mixing and crushing the following materials:

| | |
|---|---|
| 2-Benzylcarbamoyl-1,2-benzisothiazoline-3-one-1,1-dioxide: | 50 parts |
| A mixture of diatomaceous earth and clay: | 45 parts |
| Polyoxyethylene alkylphenylether: | 5 parts |

By spraying a suspension liquid (containing 500 p.p.m. of effective ingredient) prepared by diluting said wettable powder to 1000 times to rice plants one time before being attacked by leaf blast and then one time at an earlier infection of the pests (an additional spray was required after rice plants were attacked by the pest), the infestation of leaf blast was prevented and the health of rice plants was restored.

The rice plants applied by the present wettable powder have scarcely had a danger of being attacked again by leaf blast for a long period of time.

EXAMPLE 5

In accordance with the prescription of Example 4, wettable powder containing the following compounds as active ingredients were prepared:

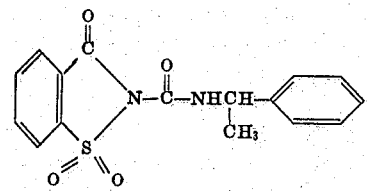

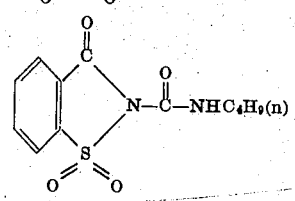

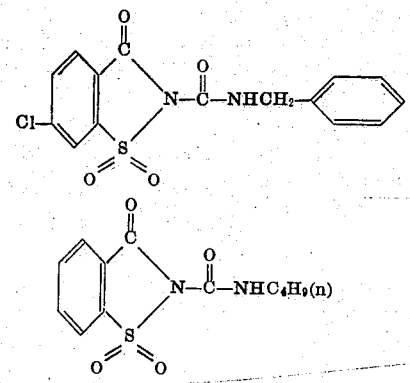

A suspension each of these wettable powders and the wettable powder obtained in Example 4 (containing 500 p.p.m. of active ingredient) prepared by diluting 1000 times was one time sprayed at a rate of 50 ml. per block by a spray gun to young rice plants (Variety: Kimmaze) grown in upland nursery bed divided into blocks of 0.42 m² at an earlier infection of leaf blast and then also one time 7 days after the first spraying.

The average indexes of infection were determined by picking 40 rice plants per block on the second, sixth and tenth days from the final spraying date and evaluating the index of infection of each plant (on the basis of the standards that 0 indicates no infections, 9 indicates the complete death and 10 grades are provided therebetween) and calculating the averages of the indexes of the respective 40 plants.

| | From final spraying date | | |
|---|---|---|---|
| Chemical tested | Second day | Sixth day | Tenth day |
| 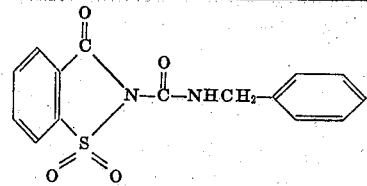 | 0 | 0.31 | 1.22 |
| 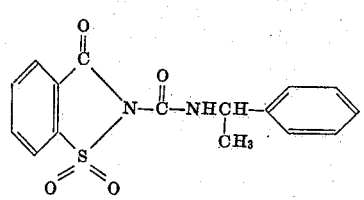 | 0.07 | 0.58 | 1.43 |
| 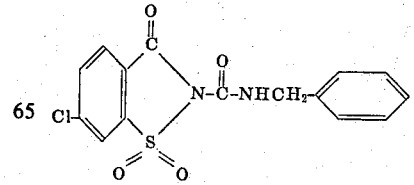 | 0.10 | 1.20 | 2.61 |

Table—Continued

| Chemical tested | From final spraying date | | |
|---|---|---|---|
| | Second day | Sixth day | Tenth day |
| (structure shown) | 0.17 | 1.48 | 3.22 |
| IBP | 0.20 | 1.61 | 4.58 |
| No treatment | 2.23 | 6.31 | 7.78 |

Remarks.—IBP is a fungicide having O,O-diisopropyl-S-benzyl thiol phosphate as active ingredient and is usually used in this field as a controlling agent.

A solution prepared by diluting a commercially available emulsion having an IBP of 48% was sprayed for comparison (containing 480 p.p.m. of active ingredient).

EXAMPLE 6

A dusting powder was prepared by mixing an crushing the following materials:

| | |
|---|---|
| 2-benzylcarbamoyl-1,2-benzisothiazoline-3-one-1,1-dioxide: | 2.5 parts |
| Blastcidin-S benzylaminobenzene sulfonate: | 0.1 part |
| Talc: | 92.4 parts |
| Calcium carbonate: | 5 parts |

By spraying said dusting powder to rice plants at a rate of 3 to 4 kg./10 a., the rice plants could be protected from the damage of blast.

EXAMPLE 7

Suspension (containing respectively 1000 p.p.m. and 250 p.p.m. of active ingredient) prepared by diluting the wettable powder of Example 4 to 500 times and 2000 times respectively were sprayed to cucumbers planted in pot (variety: Suyo) at three leaves stage grown in glasshouse at a rate of 150 ml. per block (3 pots) by a spray gun.

The next day, a suspension of spores of scab of cucumbers was sprayed to inoculate on the surface of leaves, and the treated plants were left in an incubator at 22° C. all day, and then transferred to a glass house. After 7 days from the inoculation, the number of fungal spots was looked for and the prevention rate (percent) was calculated, from which it was found that the effect of 75 percent in 250 p.p.m. and of 100 percent in 1000 p.p.m. were obtained.

EXAMPLE 8

Suspension liquids (containing respectively 1000 p.p.m. and 250 p.p.m. of active ingredient) prepared by diluting the wettable powder of Example 4 with water to 500 times and 2000 times respectively were sprayed to pot-planted cucumbers (variety: Suyo) at a rate of 200 ml. per block (3 pots).

A suspension of spores of anthracnose of cucumbers was sprayed to inoculate after drying the chemicals and after 7 days from the treatment with the chemicals, maintained in a moist chamber at 25° C. for 2 days and then transferred to a glass house.

Examining the degree of being attacked by disease after 6 days from the inoculation and calculating the prevention rate, it was found that 100 percent and 87 percent of anthracnose are prevented respectively by the chemicals of 1000 p.p.m. and 250 p.p.m. in the blocks inoculated immediately after the spray, and 92 percent and 84 percent of anthracnose are prevented respectively by the chemicals of 1000 p.p.m. and 250 p.p.m. in the blocks inoculated after 7 days from the spray.

What we claim:

1. A method of treating rice plants, to protect such plants from rice blast, comprising applying to said plants a fungicidal composition comprising an inert fungicidal carrier and, as an active ingredient, an effective amount to control rice blast of a compound represented by the formula,

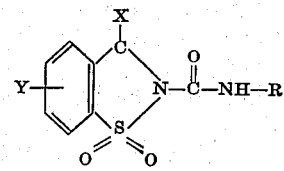

wherein X is oxygen or sulfur, Y is hydrogen, chlorine or methoxy, and R is alkyl of one to four carbon atoms; phenyl; phenyl substituted by methyl, ethyl, methoxy, ethoxy, or hydroxy; benzyl, phenylethyl or phenylpropyl; or benzyl in which the benzene ring is substituted by chlorine, methyl or nitro.

2. A method in accordance with claim 1 wherein X is oxygen and R is lower alkyl having one to four carbon atoms, phenyl or benzyl.

3. A method in accordance with claim 1 wherein said fungicidal carrier is water, alcohol, dimethylformamide, benzene, xylene or methylnaphthalene.

4. A method in accordance with claim 1 wherein said fungicidal carrier is talc, clay, bentonite, diatomaceous earth, potter's clay, sand, powdered shell, sawdust or rice hulls.

5. A method in accordance with claim 1 wherein said effective amount comprises 120–160 grams per ten ares of rice plants.

* * * * *